United States Patent
Hewett et al.

(10) Patent No.: US 6,970,757 B1
(45) Date of Patent: Nov. 29, 2005

(54) METHOD AND APPARATUS FOR UPDATING CONTROL STATE VARIABLES OF A PROCESS CONTROL MODEL BASED ON REWORK DATA

(75) Inventors: Joyce S. Oey Hewett, Austin, TX (US); Anthony J. Toprac, Austin, TX (US); Christopher A. Bode, Austin, TX (US); Alexander J. Pasadyn, Austin, TX (US); Anastasia Oshelski Peterson, Austin, TX (US); Thomas J. Sonderman, Austin, TX (US); Michael L. Miller, Cedar Park, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 821 days.

(21) Appl. No.: 09/838,467

(22) Filed: Apr. 19, 2001

(51) Int. Cl.⁷ .............................. G06F 19/00
(52) U.S. Cl. .................. 700/108; 700/121; 700/21; 716/21; 438/14
(58) Field of Search .................. 700/121, 109–111, 700/117, 51, 32, 108, 105, 120, 21, 39, 79, 700/104, 176–177; 438/14, 16; 716/21

(56) References Cited

U.S. PATENT DOCUMENTS

| 5,239,487 | A | * | 8/1993 | Horejsi et al. ............... 702/184 |
| 6,002,989 | A | * | 12/1999 | Shiba et al. .................. 702/84 |
| 6,408,219 | B2 | * | 6/2002 | Lamey et al. ............... 700/110 |
| 6,415,431 | B1 | * | 7/2002 | Neary ......................... 716/21 |
| 6,477,432 | B1 | * | 11/2002 | Chen et al. ................... 700/51 |

* cited by examiner

*Primary Examiner*—Kidest Bahta
(74) *Attorney, Agent, or Firm*—Williams, Morgan & Amerson

(57) ABSTRACT

A method for controlling a manufacturing process includes processing a plurality of workpieces in a tool; monitoring a rework rate associated with the workpieces processed in the tool; and initiating an automatic corrective action in response to the rework rate being greater than a predetermined threshold. A manufacturing system includes a tool adapted to process a plurality of workpieces and a rework controller adapted to monitor a rework rate associated with the workpieces processed in the tool and initiate an automatic corrective action in response to the rework rate being greater than a predetermined threshold.

45 Claims, 2 Drawing Sheets

METHOD AND APPARATUS FOR UPDATING CONTROL STATE VARIABLES OF A PROCESS CONTROL MODEL BASED ON REWORK DATA

BACKGROUND OF THE INVENTION

1. Field of the Invention

This invention relates generally to the field of semiconductor device manufacturing and, more particularly, to a method and apparatus for updating control state variables of a process control model based on rework data.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. Semiconductor devices are manufactured from wafers of a semiconductive material. Layers of materials are added, removed, and/or treated during fabrication to create the electrical circuits that make up the device. The fabrication essentially comprises four basic operations. The four operations are:

layering, or adding thin layers of various materials to a wafer from which a semiconductor is produced;

patterning, or removing selected portions of the added layers;

doping, or placing specific amounts of dopants in the wafer surface through openings in the added layers; and heat treatment, or heating and cooling the materials to produce desired effects in the processed wafer.

Although there are only four basic operations, they can be combined in hundreds of different ways, depending upon the particular fabrication process.

One technique for improving the operation of the semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

One commonly controlled process is the patterning operation, which is also sometimes called photolithography, photomasking, masking, and microlithography. The term "photolithography" will hereafter be used to refer to patterning operations. In photolithography, typically, a machine called a "stepper" positions a portion of a wafer being processed under a "reticle," or photomask. A reticle is a pattern created in a layer of chrome on a glass plate. Light is then shone onto the wafer through the reticle. The chrome blocks some of the light. Other types of reticles use phase shifting features in conjunction with or in lieu of a chrome layer. The light shining through the pattern on the reticle changes the material characteristics of the layer of photoresist material formed on the wafer where it illuminates the layer of photoresist. These changes make the photoresist material more or less susceptible to removal in another operation, depending on the particular process being implemented. The stepper then positions another portion of the wafer under the reticle, and the operation is repeated. This process is repeated until the entire wafer has undergone the stepper exposure operation.

Next, portions of the photoresist layer are removed or developed to expose selected portions of the underlying process layer. Thereafter, typically through one or more etching processes, the exposed portions of the underlying process layer are removed to define a pattern in the underlying process layer. The purpose of photolithography is to define in a layer of photoresist what will ultimately become patterns in or on a process layer formed on the wafer, the parts of which may ultimately become parts of the semiconductor device. These patterns in the layer of photoresist must be laid down precisely in the exact dimensions, within certain manufacturing tolerances, required by the circuit design, and the patterns must be located in the proper place.

The photolithography operations generally set the "critical dimensions" of the semiconductor devices (e.g., the width of the gate conductor in an illustrative field effect transistor), which are referred to as final inspection critical dimensions (FICD). The features in the patterned layer of photoresist also have a critical dimension, sometimes referred to as a develop inspect critical dimension (DICD). Errors in the photolithography process can cause a whole host of problems including, but not limited to, distorted patterns, misplaced patterns, and other defects. These types of errors can ultimately result in undesirable changes in the functioning of the electrical circuits so that the wafer has to be scrapped. Photolithography processes are performed at very small dimensions, so that they are also highly susceptible to contamination by unwanted variations in processing conditions.

To identify and control photolithography variations various metrology and automatic control techniques are employed. For example, post exposure metrology tests that employ scatterometry measurements or physical measurements may be conducted to determine the proper overlay and/or develop inspect critical dimensions of the photoresist layer. Based on the measured characteristics, a process controller may be employed to automatically adjust the parameters of the photolithography process (e.g., exposure dose, post exposure bake time, photoresist layer thickness, etc.) to reduce variation in the patterning process. If a measured characteristic of the photoresist layer is determined to be sufficiently outside tolerances, the photoresist layer is removed and the wafer is reworked to generate a new patterned layer.

Another fabrication process susceptible to rework is planarization, typically accomplished by a chemical mechanical polishing (CMP) operation. CMP is a widely used means of planarizing silicon dioxide as well as other types of process layers on semiconductor wafers. Chemical mechanical polishing typically utilizes an abrasive slurry disbursed in an alkaline or acidic solution to planarize the surface of a process layer through a combination of mechanical and chemical action. Generally, a chemical mechanical polishing tool includes a polishing device positioned above a rotatable circular platen or table on which a polishing pad is mounted. The polishing device may include one or more rotating carrier heads to which wafers may be secured, typically through the use of vacuum pressure. In use, the platen may be rotated and an abrasive slurry may be disbursed onto the polishing pad. Once the slurry has been applied to the polishing pad, a downward force may be applied to each rotating carrier head to press the attached wafer against the polishing pad. As the wafer is pressed against the polishing pad, the surface of the wafer is mechanically and chemically polished.

Various automatic control techniques are employed to reduce post-polish thickness variation. For example, post-polish metrology data may use used to develop a control model of the polishing tool to account for expected degradation due to the depletion of consumable polishing pads employed in the tool. Post-polish planarity measurements may also be used to identify a wafer that has not been adequately planarized. Such a wafer may be reworked to complete the planarization process.

Reworking wafers due to photolithography or planarization process errors is time consuming, requiring both additional tool time and operator time. Hence, the efficiency and profitability of the fabrication system are reduced.

The present invention is directed to overcoming, or at least reducing the effects of, one or more of the problems set forth above.

SUMMARY OF THE INVENTION

One aspect of the present invention is seen in a method for controlling a manufacturing process. The method includes processing a plurality of workpieces in a tool; monitoring a rework rate associated with the workpieces processed in the tool; and initiating an automatic corrective action in response to the rework rate being greater than a predetermined threshold.

Another aspect of the present invention is seen in a manufacturing system including a tool adapted to process a plurality of workpieces and a rework controller adapted to monitor a rework rate associated with the workpieces processed in the tool and initiate an automatic corrective action in response to the rework rate being greater than a predetermined threshold.

BRIEF DESCRIPTION OF THE DRAWINGS

The invention may be understood by reference to the following description taken in conjunction with the accompanying drawings, in which like reference numerals identify like elements, and in which.

Figure 1:
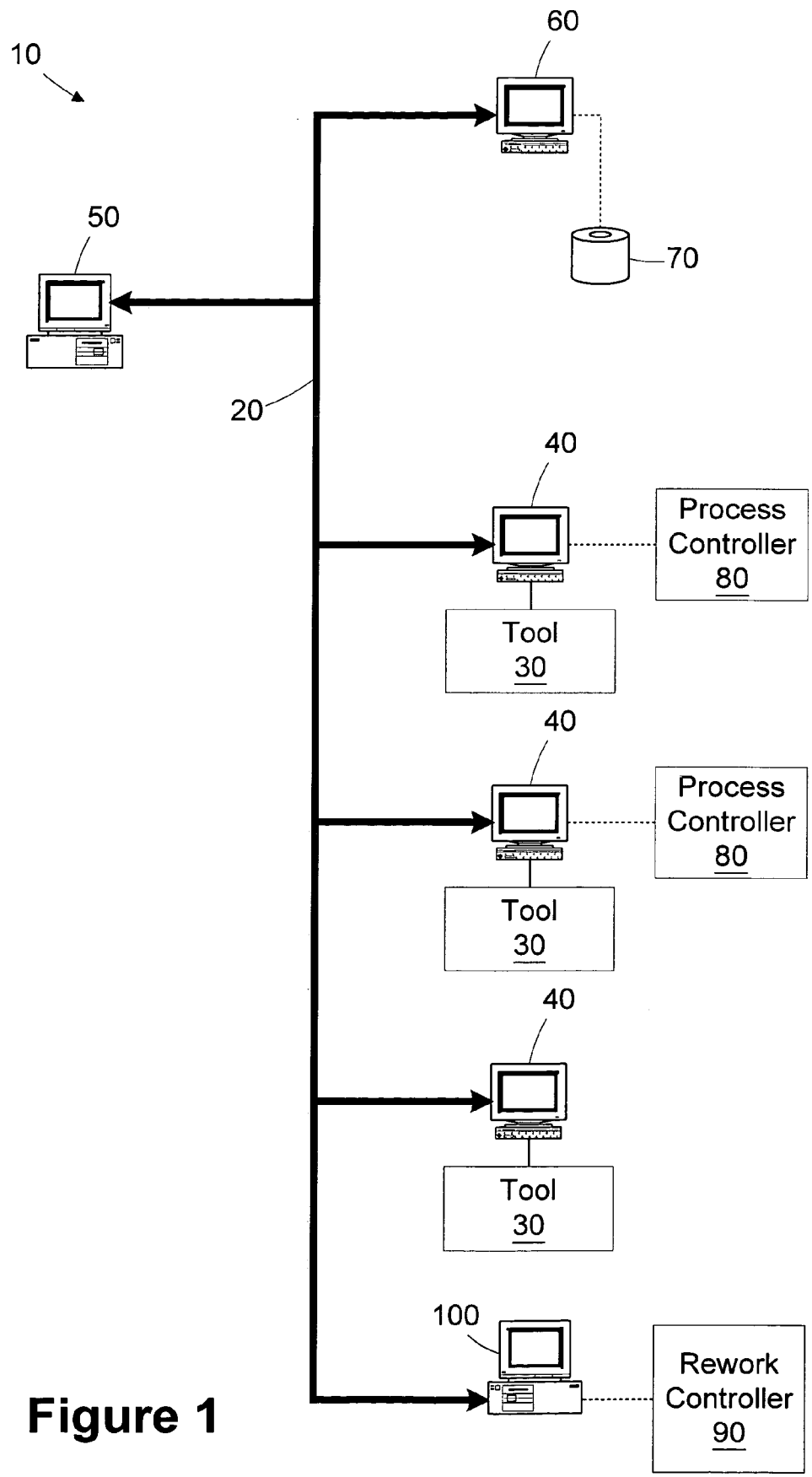
FIG. 1 is a simplified block diagram of an illustrative manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention is directed to a system and method for controlling fabrication processes based upon rework information. In particular, the present invention is directed to updating control state variables of a process control model based on rework data. As will be readily apparent to those skilled in the art upon a complete reading of the present application, the present method is applicable to a variety of technologies, e.g., NMOS, PMOS, CMOS, etc., and it is readily applicable to a variety of devices, including, but not limited to, logic devices, memory devices, etc.

Referring to FIG. 1, a simplified block diagram of an illustrative manufacturing system 10 is provided. In the illustrated embodiment, the manufacturing system is adapted to process semiconductor wafers, however, the invention is not so limited and may be applied to other types of manufacturing environments and other types of workpieces. A network 20 interconnects various components of the manufacturing system, allowing them to exchange information. The illustrative manufacturing system 10 includes a plurality of tools 30, each being coupled to a computer 40 for interfacing with the network 20. A process control server 50 directs the high level operation of the manufacturing system 10 by directing the process flow of the manufacturing system 10. The process control server 50 monitors the status of the various entities in the manufacturing system, including the tools 30. The tools may be processing tools, such as photolithography steppers, etch tools, deposition tools, polishing tools, rapid thermal processing tools, implantation tools, etc., or metrology tools for measuring characteristics of the wafers being processed in the manufacturing system 10. A database server 60 is provided for storing data related to the status of the various entities and workpieces (e.g., wafers) in the process flow. The database server 60 may store information in one or more data stores 70. The data may include pre-process and post-process metrology data, tool states, process flow activities (e.g., scheduled maintenance events, processing routes for lots of wafers), etc. The distribution of the processing and data storage functions amongst the different computers 40, 50, 60 is generally conducted to provide independence and a central information store. Of course, more or less computers may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E8-0699-Provisional Specification for CIM Framework Domain Architecture) and APC (SEMI E93-0999-Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some of the tools 30 include process controllers 80 that are adapted to automatically control the operating recipes of their respective tools 30. A particular tool 30 may have more than one process controller 80 adapted to control more than one operating recipe parameter. For example, if the tool 30 is a CMP tool, the process controller 80 may receive pre-polish thickness measurements (e.g., thickness of high features, thickness of low features) and predict a polishing time required to achieve a post-polish target thickness. In the case where the tool 30 is a photolithography tool, the process controller 80 may model the exposure time or dose based on post-exposure measurements of the develop inspect critical dimension (DICD) of the photoresist layer. The process controller 80 may use a control model of the tool 30 to generate its prediction. The control model may be developed empirically using commonly known linear or non-linear techniques. The control model may be a relatively simple equation based model (e.g., linear, exponential, weighted average, etc.) or a more complex model, such as a neural network model, principal component analysis (PCA) model, or a projection to latent structures (PLS) model. The specific implementation of the model may vary depending on the modeling technique selected. Using the control model, the process controller 80 may determine operating recipe parameters to reduce post process variations.

If post-process metrology indicates that the outgoing variation is greater than acceptable tolerances, a wafer that was processed in one of the tools 30 may be flagged for rework. The manufacturing system 10 also includes a rework controller 90 operating on a workstation 100 for monitoring the reworks initiated for the various tools. An increase in the rework rate for a particular tool 30 may indicate a control problem.

Typically, a control model technique, as employed by a process controller 80, includes generating one or more control equations for determining an operating recipe parameter of the tool 30. In a feedforward control scheme, the process controller 80 may receive an incoming measurement, such as photoresist layer thickness or process layer thickness for a layer to be planarized, and apply the control equations to generate an operating recipe parameter such as exposure time (i.e., for photolithography) or polish time (i.e., for planarization). In a feedback control scheme, the process controller 80 may receive post-process metrology information, such as DICD or planarity and determine the process variable based on the feedback. For example, a photolithography tool may start with a predetermined exposure time. The process controller 80 may use DICD measurements to periodically change the exposure time to account for variations between the measured DICD and a target DICD. In some implementations, the process controller 80 may use only a feedforward model, only a feedback model, or a combination of both feedforward and feedback models.

Generally, a control model has one or more state values or controller gain constants. For example, an exemplary linear control modeling technique includes proportional, integral, and derivative (PID) controller gain constants. The proportional component is based on the magnitude of the difference between the measured value and a target value (i.e., error signal), the integral component is based on changes in the error signal over a previous time period, and the derivative component is based on the instantaneous rate of change in the error signal. A particular linear control model may include some or all of these components. Other modeling techniques, such as non-linear models, or more complicated adaptive models, such as neural network or PCS models employ more complicated techniques, but nevertheless, these techniques are similar in that they use state values or controller gain constants in one way or another to affect the sensitivity of the control model to changes in the input variable(s). Collectively, the state values and/or controller gain constants are referred to herein as the control state variables of the process controller 80.

Typically, a characterization or training process is used to establish the values for the control state variables for a particular control model. For example, empirical tests may be performed by processing test wafers or production wafers to determine the control state variables. The control state variables may also be calculated theoretically. Numerous techniques for determining control state variables are known to those of ordinary skill in the art, so they are not described in greater detail herein.

The rework controller 90 monitors the performance of the tools 30 over time and determines if a particular tool 30 is experiencing a higher number of reworks than expected over a period of time. The particular time periods and rework threshold depends on the particular type of tool 30 being monitored and the particular process being performed by the tool 30. For example, if more than 10 lots are flagged for rework due to bad DICDs or a bad test wafer final inspection FICD, the rework controller 90 may initiate a corrective action, as described in greater detail below. The rework controller 90 may access the metrology data collected regarding the performance of the tools 30 and the overall manufacturing system 10 to determine the rework rates of the various tools 30. The rework controller 90 may be configured such that is actively notified every time a rework is requested, or alternatively, the rework controller 90 may periodically search the data stores 70 to identify reworks.

Upon identifying a tool 30 experiencing a rework rate higher than a predetermined rework threshold, the rework controller 90 may take a variety of autonomous corrective actions. In one embodiment, the rework controller 90 may send an alert message (e.g., e-mail) to an operator of the tool 30 experiencing the rework problem. In another embodiment, the rework controller 90 may log the identified tool 30 out of service with the process control server 50 and schedule a qualification procedure (e.g., test wafers) to generate data to allow the determination of new state values or controller gain constants.

In yet another embodiment, the rework controller 90 may autonomously determine new control state variables for the process controller 80 of the tool 30 experiencing the unacceptable rework rate based on process data and metrology information stored in the data stores 70. Theoretically, a control model seeks to predict the behavior of the tool 30 and modify the processing parameters such that the output of the processes matches a target value. The control state variables serve to define this model of the tool 30. By using the actual processing results stored in the data stores 70, the rework controller 90 may use the actual output of the process to solve the control equations in reverse to determine the control state variables that would have predicted such a result. The control equations may be solved based on the process and metrology data of the wafers requiring rework, or alternatively, based on the process and metrology data of wafers in the same lot as the wafers requiring rework.

Generally, wafers processed in a particular lot are all exposed to a similar processing environment and have similar properties. The rework controller 90 may use the process and metrology data gathered from the wafers in a particular lot and determine the control state variables for the control model of the tool 30 based on this data (i.e., by solving the control equation in reverse as described above) to prepare the tool 30 to perform the rework on the rejected wafers. That is, when a particular wafer requiring rework is provided to the tool 30, the rework controller 90 may determine the proper control state variables based on the historical data collected from the other wafers in the same lot as the one being reworked. If a subsequent rework wafer from a different lot is presented at the tool 30, the rework controller 90 may re-initialize the control state variables of the process controller 90 based on the historical data associated with its associated lot. In such a manner, the similarity of processing conditions between the reworked wafer and the other wafers in the same lot may be retained.

Figure 2:
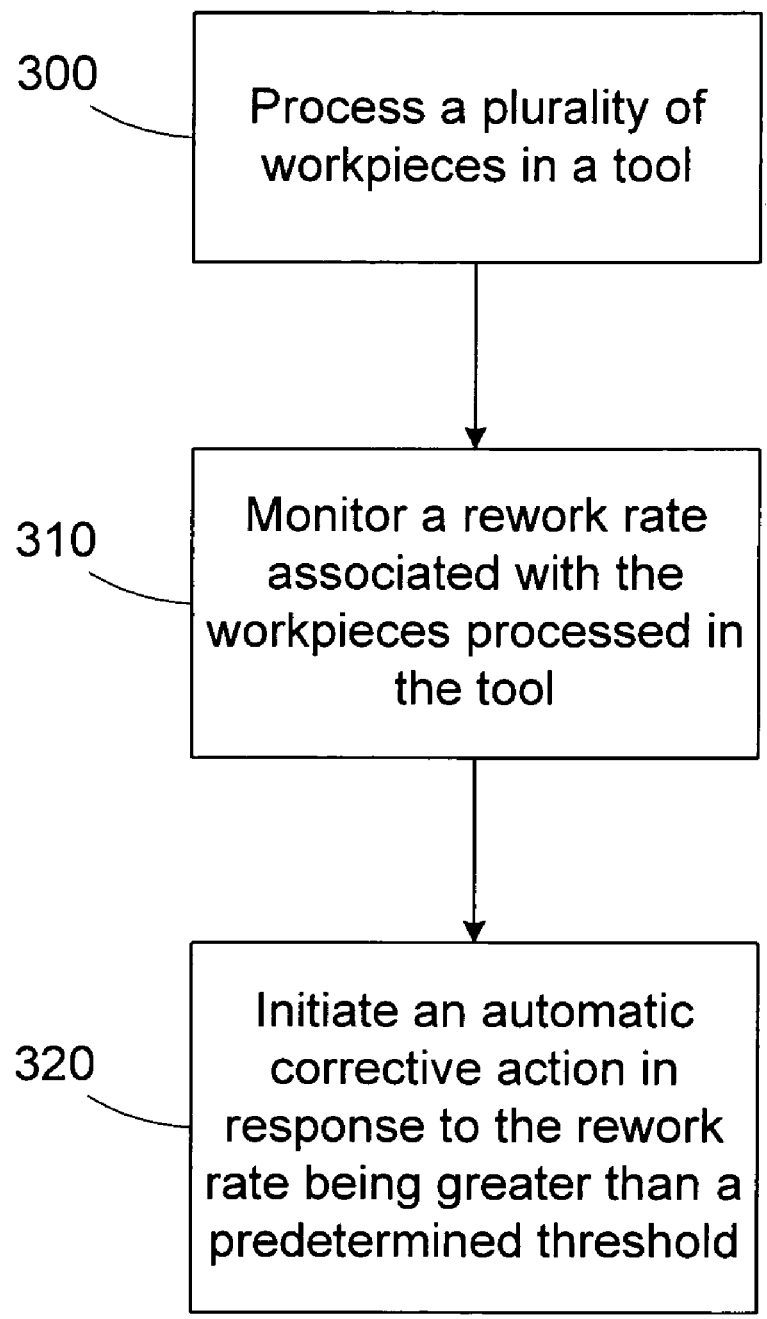
FIG. 2 is a simplified flow diagram of a method for updating a process control model based on rework data in accordance with another illustrative embodiment of the present invention.

FIG. 2 is a simplified flow diagram of a method for updating control state variables of a process control model based on rework data in accordance with another illustrative embodiment of the present invention. In block 200, a plurality of workpieces are processed in a tool 30. In block 210, a rework rate associated with the workpieces processed in the tool 30 is monitored. In block 220, an automatic corrective action is initiated in response to the rework rate being greater than a predetermined threshold. The automatic corrective action may include sending an alert message to an operator of the tool 30, logging the tool 30 out of service, and/or adjusting a control model used to control the processing of the workpieces in the tool 30.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer implementation method for controlling a manufacturing process, comprising:

processing a plurality of workpieces in a tool;

monitoring a rework rate associated with the workpieces processed in the tool;

controlling at least one operating recipe parameter of the tool based on a process control model having at least one control state variable; and initiating an automatic corrective action in response to the rework rate being greater than a predetermined threshold, wherein initiating the automatic corrective action comprises determining a value of the control state variable retrieving metrology data associated with the processing of the workpieces in the tool; and solving the control equation in reverse based on the metrology date to determine the value of the control state variable.

2. The computer implantation method of claim 1, wherein initiating the automatic corrective action further comprises sending an alert message to an operator of the tool.

3. The computer implementation method of claim 1, wherein initiating the automatic corrective action further comprises logging the tool out of service.

4. The computer implementation method of claim 3, wherein logging the tool out of service includes sending a message to a process control server.

5. The computer implementation method of claim 1, further comprising:

processing a workpiece requiring rework in the tool; and controlling the processing of the workpiece requiring rework based on the determined value of the control state variable.

6. The computer implementation method of claim 1, further comprising:
retrieving metrology data associated with the processing of the workpieces in the tool; and
determining the value of the control state variable based on the metrology data.

7. The computer implementation method of claim 6, wherein the workpieces are arranged in lots, and retrieving the metrology data comprises retrieving the metrology data for workpieces in a particular lot associated with a workpiece requiring rework.

8. The computer implementation method of claim 7, further comprising:
processing the workpiece requiring rework in the tool; and
controlling the processing of the workpiece requiring rework based on the determined value of the control state variable.

9. The computer implementation method of claim 1, wherein processing the plurality of workpieces in the tool comprises processing the plurality of workpieces in a photolithography tool.

10. The computer implementation method of claim 1, wherein processing the plurality of workpieces in the tool comprises processing the plurality of workpieces in a polishing tool.

11. A computer implementation method for controlling a manufacturing process, comprising:
processing a plurality of workpieces in a tool;
controlling at least one opting recipe parameter of the tool based on a pros control model having at least one control state variable;
monitoring a rework rate associated with the workpieces processed in the tool; and
determining a value of the control state variable in response to the rework rate being greater than a predetermined threshold retrieving metrology data associated with the processing of the workpieces in the tool; and solving the control equation in reverse based on the metrology date to determine the value of the control state variable.

12. The computer implementation method of claim 11, further comprising:
retrieving metrology data associated with the processing of the workpieces in the tool; and
determining the value of the control state variable based on the metrology data.

13. The computer implementation method of claim 11, further comprising:
processing a work-piece requiring rework in the tool; and
controlling the processing of the workpiece requiring rework based on the determined value of the control state variable.

14. The computer implementation method of claim 12, wherein the workpieces are arranged in lots, and retrieving the metrology data comprises retrieving the metrology data for workpieces in a particular lot associated with a workpiece requiring rework.

15. The computer implementation method of claim 14, further comprising:
processing the workpiece requiring rework in the tool; and
controlling the processing of the workpiece requiring rework based on the determined value of the control state variable.

16. The computer implementation method of claim 11, wherein processing the plurality of workpieces in the tool comprises processing the plurality of workpieces in a photolithography tool.

17. The computer implementation method of claim 11, wherein processing the plurality of workpieces in the tool comprises processing the plurality of workpieces in a polishing tool.

18. A computer implementation method for controlling a manufacturing process, comprising:
processing a plurality of workpieces in a tool;
controlling at least one operating recipe parameter of the tool based on a process control model having at least one control state variable;
monitoring a rework rate associated with the workpieces processed in the tool;
identifying a condition where the rework rate is greater than a predetermined threshold;
retrieving metrology data associated with the processing of the workpieces in the tool;
solving the control equation in reverse based on the metrology date to determine a new value for the control state variable; and
processing a subsequent workpiece in the tool in accordance with the new value of the control state variable.

19. The computer implementation method of claim 18, wherein the workpieces are arranged in lots, and retrieving the metrology data comprises retrieving the metrology data for workpieces in a particular lot associated with the subsequent workpiece.

20. The computer implementation method of claim 18, wherein processing the plurality of workpieces in the tool comprises processing the plurality of workpieces in a photolithography tool.

21. The computer implementation method of claim 18, wherein processing the plurality of workpieces in the tool comprises processing the plurality of workpieces in a polishing tool.

22. A manufacturing system, comprising:
a tool adapted to process a plurality of workpieces;
a process controller adapted to control at least one operating recipe parameter of the tool based on a process control model having at least one control state variable; and
a rework controller adapted to monitor a rework rate associated with the workpieces processed in the tool and initiate an automatic corrective action in response to the rework rate being greater than a predetermined threshold, and wherein the rework controller is further adapted to determine a value of the control state variable in response to the rework rate being greater than a predetermined threshold retrieving metrology data associated with the processing of the workpieces in the tool; and solving the control equation in reverse based on the metrology date to determine the value of the control state variable.

23. The system of claim 22, wherein the rework controller is further adapted to send an alert message to an operator of the tool in response to the rework rate being greater than a predetermined threshold.

24. The system of claim 22, wherein the rework controller is further adapted to log the tool out of service in response to the rework rate being greater than a predetermined threshold.

25. The system of claim 24, wherein the rework controller is further adapted to log the tool out of service by sending a message to a process control server in response to the rework rate being greater than a predetermined threshold.

26. The system of claim 22, wherein the tool is further adapted to process a workpiece requiring rework, and the process controller is further adapted to control the processing of the workpiece requiring rework based on the determined value of the control state variable.

27. The system of claim 22, wherein the rework controller is further adapted to retrieve metrology data associated with the processing of the workpieces in the tool and determine the value of the control state variable based on the metrology data.

28. The system of claim 27, wherein the workpieces are arranged in lots, and the metrology data comprises metrology data for workpieces in a particular lot associated with a workpiece requiring rework.

29. The system of claim 28, wherein the tool is further adapted to process the workpiece requiring rework, and the process controller is further adapted to control the processing of the workpiece requiring rework based on the determined value of the control state variable.

30. The system of claim 22, wherein the tool comprises a photolithography tool.

31. The system of claim 22, wherein the tool comprises a polishing tool.

32. A manufacturing system, comprising:
a tool adapted to process a plurality of workpieces;
a process controller adapted to control at least one operating recipe parameter of the tool based on a process control model having at least one control state variable; and
a rework controller adapted to monitor a rework rate associated with the workpieces processed in the tool and determine a value of the control state variable in response to the rework rate being greater than a predetermined threshold retrieving metrology data associated with the processing of the workpieces in the tool; and solving the control equation in reverse based on the metrology date to determine the value of the control state variable.

33. The system of claim 32, wherein the rework controller is further adapted to retrieve metrology data associated with the processing of the workpieces in the tool and determine the value of the control state variable based on the metrology data.

34. The system of claim 32, wherein the tool is further adapted to process a workpiece requiring rework, and the process controller is further adapted to control the processing of the workpiece requiring rework based on the determined value of the control state variable.

35. The system of claim 34, wherein the workpieces are arranged in lots, and the metrology data comprises metrology data for workpieces in a particular lot associated with a workpiece requiring rework.

36. The system of claim 35, wherein the tool is further adapted to process the workpiece requiring rework and the process controller is further adapted to control the processing of the workpiece requiring rework based on the determined value of the control state variable.

37. The system of claim 32, wherein the tool comprises a photolithography tool.

38. The system of claim 32, wherein the tool comprises a polishing tool.

39. A system for controlling a manufacturing process, comprising:
a tool adapted to process a plurality of workpieces;
a process controller adapted to control at least one operating recipe parameter of the tool based on a process control model having at least one control state variable; and
a rework controller adapted to monitor a rework rate associated with the workpieces processed in the tool, identify a condition where the rework rate is greater than a predetermined threshold, retrieve metrology data associated with the processing of the workpieces in the tool, and solve the control equation in reverse based on the metrology date to determine a new value for the control state variable, wherein the tool is further adapted to process a subsequent workpiece in accordance with the new value of the control state variable.

40. The system of claim 39, wherein the workpieces are arranged in lots, and the metrology data comprises metrology data for workpieces in a particular lot associated with the subsequent workpiece.

41. The system of claim 39, wherein the tool comprises a photolithography tool.

42. The system of claim 39, wherein the tool comprises a polishing tool.

43. A manufacturing system, comprising:
means for processing a plurality of workpieces;
means for monitoring a rework rate associated with the means for processing of workpieces;
means for controlling least one operating recipe parameter of the tool based on a process control model having at least one control state variable and
means for initiating an automatic corrective action in response to the rework rate being greater than a predetermined threshold, wherein initiating the automatic corrective action comprises determining a value of the control state variable retrieving metrology data associated with the processing of the workpieces in the tool; and solving the control equation in reverse based on the metrology date to determine the value of the control state variable.

44. A manufacturing system, comprising:
means for processing a plurality of workpieces;
means for controlling at least one operating recipe parameter of the processing based on a process control model having at least one control state variable;
means for monitoring a rework rate associated with the means for processing of workpieces; and
means for determining a value of the control state variable in response to the rework rate being greater than a predetermined threshold.

45. A manufacturing system, comprising:
means for processing a plurality of workpieces,
means for controlling at least one operating recipe parameter of the processing based on a process control model having at least one control state variable;
means for monitoring a rework rate associated with the means for processing of workpieces;
means for identifying a condition where the rework rate is greater than a predetermined threshold retrieving metrology data associated with the processing of the workpieces in the tool; and solving the control equation in reverse based on the metrology date to determine the value of the control state variable;
means for retrieving metrology data associated with the processing of the workpieces;
means for solving the control equation in reverse based on the metrology date to determine a new value for the control state variable; and
means for processing a subsequent workpiece in accordance with the new value of the control state variable.

* * * * *